I. M. WEST.
Earth Augers.
No. 137,744.
Patented April 8, 1873.
Fig. 1.
Fig. 2.
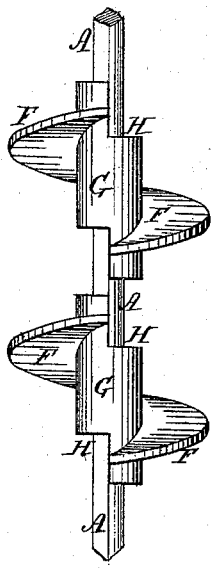
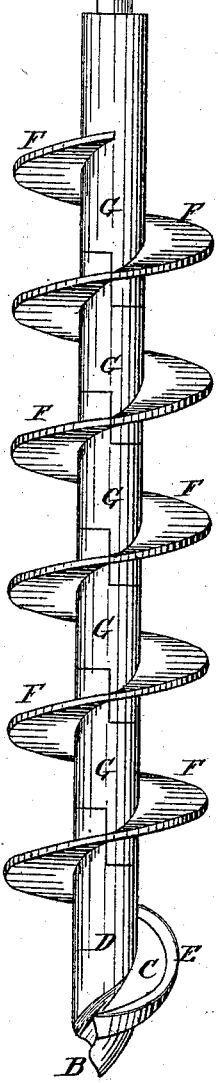
Fig. 3.
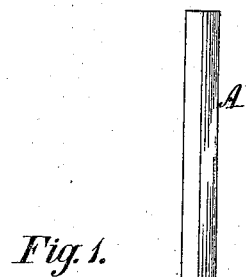
Witnesses:
Harry M. Phillips.
W<sup>m</sup> J. Peyton.
Inventor:
Ichabod M. West,
By Johnson, Haueke & Co.
his Attorneys.
AM. PHOTO-LITHOGRAPHIC CO. N.Y. (OSBORNE'S PROCESS.)

UNITED STATES PATENT OFFICE.

ICHABOD M. WEST, OF SUMMIT, ASSIGNOR OF ONE-HALF HIS RIGHT TO HENRY A. IDDINGS, OF CRETE, NEBRASKA.

IMPROVEMENT IN EARTH-AUGERS.

Specification forming part of Letters Patent No. 137,744, dated April 8, 1873; application filed February 18, 1873.

*To all whom it may concern:*

Be it known that I, ICHABOD M. WEST, of Summit, in the county of Butler and State of Nebraska, have invented certain new and useful Improvements in Well-Augers, of which the following is a specification:

This invention has for its object to furnish an auger for boring wells, &c., which shall be simple in construction, effective in operation, and more suitable for general use than others heretofore known. The invention chiefly consists in constructing the helix or worm of the auger in separate sections, formed with sleeves or collars which are fitted on a vertical stem or shaft and connected in such a manner with each other by lap or rabbet interlocking joints that a continuous worm or helix is formed free from abrupt terminations of the adjoining sections, which would retard the progress of the auger, as will be hereinafter more fully described.

In the accompanying drawing, Figure 1 represents an elevation of an auger embracing my invention. Fig. 2 represents a detached view of one of the auger-sections, and Fig. 3 a horizontal section at the line $x\ x$ of Fig. 1.

The stem or vertical shaft A of the auger to which the power is applied, and which carries the boring devices, is of a square or other angular form, and is provided at its lower end with a penetrating point, B, of steel, which is welded or detachably secured to the same by bolts or rivets. A lower sectional web or convolute wing, C, is formed with a sleeve or collar, D, which is fitted on the stem A and securely but detachably affixed to the same by means of a transverse bolt or other fastening device. To the edge of said stationary wing C is affixed, by means of screws or otherwise, a detachable curved cutter or knife, E, the object of which is to cut or shave off smooth the side of the hole or well through clay or other tenacious earth, for enabling the dirt and auger to be readily removed. The helix or worm of the auger proper is formed of a series of separate or independent sections consisting of spiral wings F, which are formed or cast with sleeves or collars G superposed or fitted on the square stem A, which is made of an angular shape in order that the worm may not revolve or turn on the same when in operation. The ends of the sleeves of the sectional helices are rabbeted, as shown at H, so that when the same are fitted on the shaft their contiguous ends will overlap each other, causing the adjoining edges of the helices to come in contact with each other, thus producing a worm which is free from the abrupt or isolated terminations of the sections as in augers heretofore constructed. The sections or sleeves connected with each other by rabbet joints will also obviate the use of set-screws or other fastening devices for securing the same to the stem, as the weight of the sections, when superposed, will serve to prevent the dislocation of the joint, while not preventing the ready removal or application of additional helices for diminishing or increasing the length of the worm.

I am aware that it is not new to construct the worm or helix of a well-auger in separate sections, and this I do not, therefore, desire to claim, broadly; but What I deem as new, and claim as my invention, is—

1. The sectional helices F formed with sleeves or collars G, the adjoining ends of which are connected by lap or rabbet joints for forming a continuous worm, as herein set forth.

2. The well-auger herein described consisting of the angular stem A, point B, stationary wing C, detachable cutter E, and worm or helix formed of a series of separate and detachable sections, F G, connected and relatively arranged with each other in the manner specified.

In testimony whereof I have hereunto set my hand this 7th day of November, A. D. 1872.

ICHABOD M. WEST.

Witnesses:
WM. V. NICKLES,
P. J. STEVENSON.